United States Patent [19]

Jaquette et al.

[11] Patent Number: 5,602,814
[45] Date of Patent: Feb. 11, 1997

[54] CALIBRATION OF WRITE-ONCE DISKS USING A SINGLE DISK SECTOR

[75] Inventors: Glen A. Jaquette; Arturo A. Mojica, both of Tucson, Ariz.

[73] Assignee: International Business Machines Corporation, Armonk, N.Y.

[21] Appl. No.: 319,179

[22] Filed: Oct. 6, 1994

[51] Int. Cl.$^6$ .................................................. G11B 3/90
[52] U.S. Cl. ........................ 369/58; 369/116; 369/44.26
[58] Field of Search ............................... 369/54, 58, 116, 369/47, 44.26, 48

[56] References Cited

U.S. PATENT DOCUMENTS

| | | | |
|---|---|---|---|
| 4,631,713 | 12/1986 | Romeas et al. | 369/54 |
| 5,070,495 | 12/1991 | Bletscher et al. | 369/116 |
| 5,134,602 | 7/1992 | Baca et al. | 369/44.27 |
| 5,136,569 | 8/1992 | Fennema et al. | 369/58 |
| 5,155,722 | 10/1992 | Yoshida | 369/54 X |
| 5,185,733 | 2/1993 | Finkelstein et al. | 369/54 |
| 5,185,734 | 2/1993 | Call et al. | 369/116 |
| 5,216,659 | 6/1993 | Call et al. | 369/116 |
| 5,226,027 | 7/1993 | Bakx | 369/58 |
| 5,233,584 | 8/1993 | Kulakowski et al. | 369/44.27 |

Primary Examiner—Aristotelis Psitos
Assistant Examiner—Duncan Wilkinson
Attorney, Agent, or Firm—D. A. Shifrin; H. Somermeyer

[57] ABSTRACT

A write-once read-many (WORM) optical disk recorder automatically calibrates its laser to emit a laser beam of a desired power level. While writing data to the WORM disk, a laser test signal is written to a laser checking area termed Automatic Laser Power Correction (ALPC) field. If the emitted laser test signal has a power level outside an acceptable power level window, then inappropriate laser power is indicated. Then, in an error recovery procedure (ERP) the laser power is calibrated in the data sector to be written to using short spaced-apart laser test signals. After successful calibration, data are written to the sector. The test signals appear as burst errors that can be corrected by a suitable error correction code. If such calibration is not successful then a write calibrate sector, WCS, is created and used for an extensive automatic calibration. In the WCS both laser power level is calibrated. The calibration result information is written to WCS for later use. A WCS may be created by command from a controller or attaching host for calibrating the laser and its control circuits in a WORM disk device. The WCS can also be written as a part of an ERP initiated by an unsuccessful write operation in one or more target sectors. Such initiation is based upon a determination that an inappropriate write power level may have been used in the attempted data writing.

24 Claims, 8 Drawing Sheets

ALPC-AUTOMATIC LASER POWER CALIBRATION

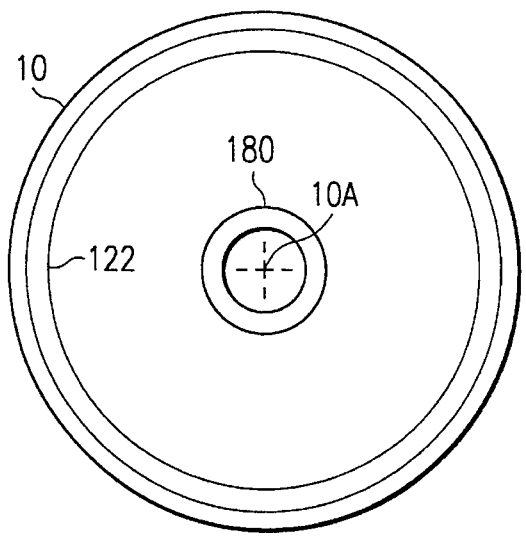
FIG. 9
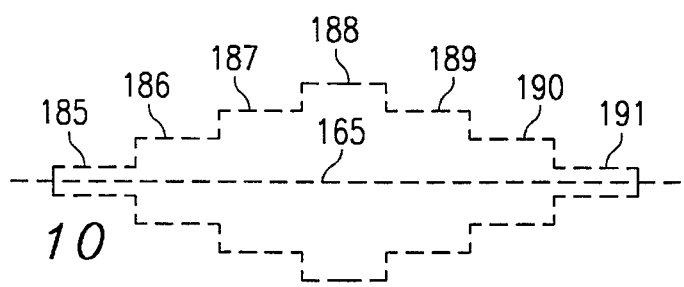
FIG. 10
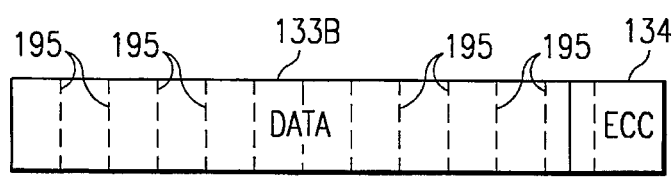
FIG. 11
FIG. 12
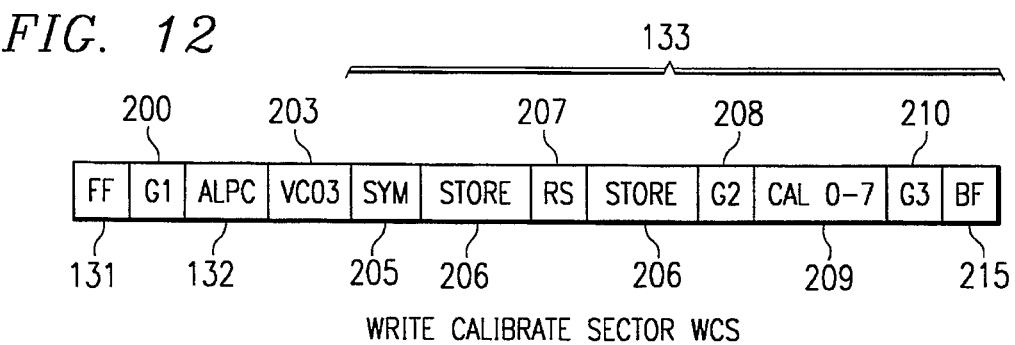
WRITE CALIBRATE SECTOR WCS
G — GAP  CAL — CALIBRATE
RS — RE-SYNC  BF — BLOCK FORMAT
SYM — SYNC MARK  FF — FLAG FIELD

CALIBRATION OF WRITE-ONCE DISKS USING A SINGLE DISK SECTOR

DOCUMENTS INCORPORATED BY REFERENCE

Finkelstein et al U.S. Pat. No. 5,185,733 is incorporated for its invention of using maximum readback signal amplitude as a criterion for setting laser write power.

Call et al U.S. Pat. No. 5,185,734 is incorporated for its invention of calibrating laser drive circuits, in particular for calibrating a digital-to-analogue converter (DAC).

FIELD OF THE INVENTION

This invention relates to calibrating laser drive circuits in write-once read-many (WORM) media in a manner to minimize usage of write-once sectors.

BACKGROUND OF THE INVENTION

Write-once read-many (WORM) optical media have stamped indications of manufacturer selected laser power level for recording or writing data on to the respective media. It is a current common practice to read and use such stamped indications for reading and writing data from and to a WORM disk. As such, upon loading a WORM disk into a WORM device, the laser is not initially calibrated in an in-focus condition at the recording layer of the WORM disk. The laser is initially calibrated in an out-of-focus condition to establish laser power to digital-to-analog convertor (DAC) relationship. This calibration enables the DAC to drive the laser to emit a beam power indicated by the known manufacturer's stamped indicated power level on the disk. Such calibration converts units used in the drive and factored by an estimated laser efficiency shift from an out-of-focus condition to an in-focus condition and a power to DAC relationship, such as set forth in the Call et al patent, supra. Bringing the laser beam into focus introduces an optical feedback via an external cavity effected by laser emitted light reflected by the optical medium. Such reflected light is coupled back into the laser as permitted by current optical heads used in magneto-optical recorders. Even though such optical feedback changes the lasing characteristics of laser operation, out-of-focus laser calibration avoids using write once data space for laser calibration thereby preserving write once data storage space to record data. For best operation it is desired to obtain better quality operation by in-focus calibrating a laser for write operations to a write once disk. Such calibration must be done in a manner to minimize usage of the limited write-once data storage areas on each given WORM optical disk.

Because of variability between optical media, media aging and laser control circuit aging, media and optical path contamination, actual emitted laser beam power for optimum recording may be different from laser drive current settings based upon such media-indicated laser beam power level. The above-mentioned aging may vary the operation of laser control circuits and media response resulting in either an undesired laser over-power level or laser under-power level situation. Such over-power laser beam levels can over ablate a track so as to obliterate adjacent recorded data, destroy a groove that interferes with tracking following and seeking, and the like. Such under-power levels may result in defective recording. Both error conditions may cause data losses. Therefore, it is desired to calibrate laser power level in a write-once media recorder to avoid such under or over power laser beam levels.

To accommodate the above-described variability between optical disk, The above-mentioned procedure of using a power level indicated by information stamped onto the disk can be approximated by calibrating a laser using an out-of-focus laser beam. Such out-of-focus calibration does not ablate the recording layer of a WORM disk. However, such out-of-focus calibration does not accurately reflect in-focus lasing, As a substitute for desired in-focus calibration, in-focus laser drive current values are calculated based upon out-of-focus (at the recording layer) measurements and an estimated efficiency shift of laser operation between such out-of-focus and in-focus changes in the laser beam.

Such out-of-focus calibration may result in a laser beam power level that is different than a desired laser beam level. That is, the laser beam power level for a given laser drive current changes as the beam is focused. This phenomena is caused by a shift in the differential efficiency of a semiconductor laser used in optical recording as the laser beam spot on an optical disk becomes focussed. Such shifts occurs because of light reflected from the disk into the laser cavity creating a cavity external to the laser. This shift in laser differential efficiency not only varies from laser to laser but also is affected by the efficiency of the optical feedback path. The optical path variability is caused by media variations and by contamination of the optical path (objective lens). Therefore, it is desired to calibrate and control laser beam power level in a write-once recorder using an in-focus beam and in a manner that data-storage space is not used.

In write-once media systems, it is not cost effective to use the media data-storing areas for calibrating a laser, such as is reasonable in rewriteable optical disks (usually magneto-optical). Since it is still desired to calibrate a laser beam power level in an in-focus condition, such in-focus calibration should be accomplished without unduly using data fields of disk sectors that would reduce the data-storage capacity of the disk.

In many write-once optical disks, a two-byte automatic laser power correction (ALPC) field is provided in each write-once disk sector. This ALPC field enables correcting laser power for writing data at a correct or desired emitted laser power level. The ALPC field also enables the laser to be operated at write level outside of any data area. Such writing of a laser test signal in the ALPC field is monitored for ensuring that the laser is emitting a proper level laser beam to the disk. Such monitoring is made with a photo detector receiving either the so-called wasted light from a beam splitter or using light from an auxiliary port of the laser. This ALPC write testing merely turned the laser continuously on at write level for a period of time less than time required to scan two bytes on the disk. Such an extended-time continuous write signal can have excessive energy resulting in so-called over-ablation (causes servo track following and seeking problems), i.e. the area ablated (physical size of the recorded laser test signal) exceeds the track width and may exceed the length of the ALPC field. Remember that such laser power level verification is measured at the output of the laser and does not measure ablation on an optical disk.

A reason for this undesired over ablation is that the duty cycle is different from a usual write pulse duty cycle. That is, a usual write pulse has a duty factor of about 10% that ablates about one-half of the track width. In contrast, the 100% duty cycle used in the laser ALPC write qualification is extreme and can ablate radially outside of the track being written to. Such over ablation not only extends radially but also circumferentially (at the trailing edge of the DC write pulse). While the duration of a recorded laser test signal need not fill the ALPC 2-byte field, many recorders do record such a laser test signal. In the latter instance, excessive laser power level results in a recorded laser test signal that crowds or extends to an ensuing write area, such as a sync area that precedes recorded user data. Recorded laser test signals having a shorter length may still radially over ablate in the ALPC area. Therefore, such extended continuous laser emissions may have undesired heating of the laser and its immediate environs. It is desired to avoid such over ablation.

The so-called correct write power level is also dependent on the duration or width of a laser write pulse. Writing in write-once media often assumes that the recorded write power level on each disk is correct. Because of circuit variations, signal delay tolerances of ±5%, signal propagation asymmetries in various circuits, and the like, unintended variation of actual write pulse widths (durations) may occur. Such pulse width variation has a non-linear effect on data recording in a WORM disk. It is desired to avoid such unintended variations of write-once recording.

Magneto-optical recorders also calibrate their respective lasers while in-focus for writing data. Such calibration requires many sectors for each calibration, as pointed out in the prior art below. It is important in WORM media to minimize the amount of data-storage space used for calibration of lasers. Therefore, the techniques used for magneto-optical recorders do not necessarily apply to calibrating lasers in WORM media drives or devices.

DISCUSSION OF PRIOR ART

Romeas et al in U.S. Pat. No. 4,631,713 show recording binary test words on a write-once optical disk having a 10 repeated pattern. The durations of the respective "1" and "0" portions of the test pattern are measured. The laser write power that results in equality of the durations of the 1 and 0 portions are equal is selected as the recording value. This calibration requires using valuable disk space that is desired to be avoided.

Bletscher, Jr et al in U.S. Pat. No. 5,070,495 show an extensive calibration system based on symmetry parameters. This calibration requires excessive data storage space. While practical for rewriteable media, it is not economical for write-once media.

Baca et al in U.S. Pat. No. 5,134,602 show calibrating some disk recorder parameters while the disk is being brought to operating speed. Remaining parameters are calibrated after the disk is rotating at an operating speed. One of the parameters that are delayed for calibration is laser write power level.

Fennema et al in U.S. Pat. No. 5,136,569 show a write calibration based upon the type of medium is sensed. If a rewriteable medium is sensed, then extensive calibration of the laser, such as discussed above, is employed. If a write-once(WORM) medium is detected, then limited calibration is performed. This patent illustrates the need for conserving disk space in write-once media. It is desired to provide for an extended laser calibration technique that does not use data-storing areas.

Finkelstein et al in U.S. Pat. No. 5,185,733 show another extensive laser calibration using randomly selected tracks. This method and apparatus are appropriate to rewriteable media only. The calibration results in selecting a write laser power level that results in a maximum readback signal amplitude.

Call et al in U.S. Pat. No. 5,216,659 show a laser power calibration by measuring laser drive current in an out-of-focus beam condition at the surface of a WORM medium and in an in-focus condition of the laser beam. A slope is generated representing variations in laser beam power level versus laser current that enables calculations of laser power based on laser current.

Bakx in U.S. Pat. No. 5,226,027 shows obtaining an optimum parameter for a disk that influences recording quality. Testing and auxiliary pattern areas are required. Also, a series of calibration areas are required. It is desired to reduce the disk area requirements for calibration from that required by Bakx.

Kulakowski et al in U.S. Pat. No. 5,233,584 show an error control system for optical disks. High-low criteria indicate acceptability of diverse types of recorded data, viz control data, user data, address data and the like. In response to an unacceptable recording, as a part of an error recovery procedure, the focus and tracking circuits are recalibrated. Then a retry for changing the recorded data from unacceptable to acceptable is attempted. Data, even though readable, may be reassigned to an alternate sector when the criteria for acceptability are not met.

SUMMARY OF THE INVENTION

An object of this invention is to provide laser calibration in write-once media while using a minimal amount of data-storage space for such laser calibration.

It is another object of this invention to provide one multiple-parameter laser calibration in not more than one sector of a write-once disk.

In one aspect of the invention, laser power calibration is achieved in a data sector by recording a plurality of one or two byte calibration signals in a spaced apart relationship. The arrangement is such that data may be later recorded in that data sector with the test signals appearing as short burst errors. An error correcting system enables reading the data and correcting out the test signal caused burst errors. The spacing of the test signals in the data sector is chosen based upon the error correcting syndrome parameters of the error correcting system.

In another aspect of the invention, a write calibration sector (WCS) is created. Such a sector includes laser power calibration as set forth above, calibration of laser drive circuits and storage of calibration results for later use.

In yet another aspect of the invention, a detected possible inappropriate laser write power results in an error recovery procedure that includes recalibrating laser drive power using a reserved portion of one or more data sectors. After such calibration and an associated laser power adjustment, a plurality of data sectors are written to using the adjusted laser power level. In each such sector, a laser power test signal is written. While writing the test signal into an laser checking or ALPC area, the emitted laser write beam is sensed (using waste laser light) and examined for measuring the power level of the emitted ALPC write pulse for determining whether the laser drive current adjustment provides an appropriate laser drive power for writing data onto a write-once disk. Such emitted power level can be detected by measuring length or duration or measuring the intensity of the emitted laser-light write pulse.

In a sequence of tests and calibrations, the laser power level is first adjusted. If the adjustment results in an unacceptable recording, then a write calibrate sector WCS is created and used to calibrate the laser drive circuits as well as test laser power level.

5

The foregoing and other objects, features and advantages of the invention will be apparent from the following more particular description of preferred embodiments of the invention, as illustrated in the accompanying drawings.

DESCRIPTION OF THE DRAWING

FIG. 9 is a simplified diagrammatic plan view of an WORM optical disk.

FIG. 10 graphically illustrates a laser power test pattern.

FIG. 11 diagrammatically illustrates a data sector having a plurality of laser test positions that permit overwriting the sector with user data by using the ECC to correct the test position induced data errors.

FIG. 12 diagrammatically illustrates a write calibrate sector.

DETAILED DESCRIPTION

Referring now more particularly to the appended drawing, like numerals indicate like parts and structural features in the various figures. This description assumes that a laser 14 has been calibrated using a laser beam in an out-of-focus state, as is known in the art. It is also assumed that the usual initialization procedures used in start up for WORM optical disk devices have been completed.

Figure 1:
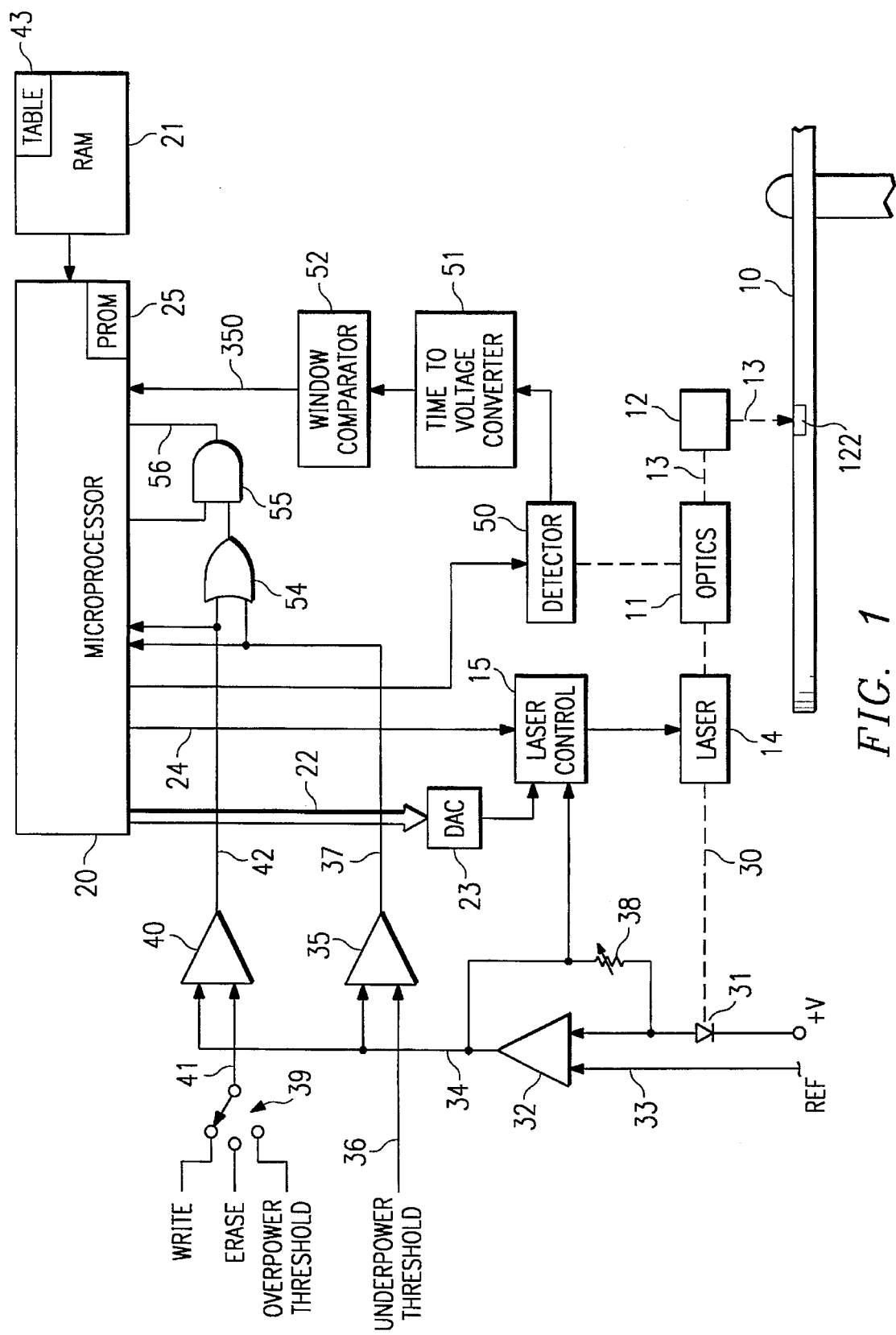
FIG. 1 is a simplified block diagram of a WORM optical disk recorder in which the invention is advantageously employed.

A write-once read-many disk 10 is suitably mounted for rotation in the illustrated optical disk recorder (mechanical details not shown). Other types of optical media may also be employed while practicing the present invention. An optical system 11, which includes the usual beam splitters, and the like, supplies a light beam through objective lens 12 over light path 13 and receives reflected light from disk 10 track 122 over the same path and objective lens 12. Laser 14 supplies a light beam through optics 11 to disk 10 as controlled by laser control 15, in a usual manner. The FIG. 1 illustrated recorder-player is under control of a programmed microprocessor 20 which has a random access memory (RAM) 21. To actuate or drive laser 14 to emit a laser beam of a desired power level, microprocessor 20 supplies a digital value over cable 22 to digital to analog converter (DAC) 23. DAC 23 supplies an analog signal to laser control 15 for determining the recording beam intensity emitted by laser 14 to optics 11. Such laser output light intensity includes modulation based upon data as supplied by microprocessor 20, or other data handling circuits. Line 24, extending from microprocessor 20 to laser control 15, signifies additional mode controls for controlling the laser control circuits 15.

Laser 14 is controlled in intensity by a usual feedback control circuit in laser control 15. Feedback of the emitted laser beam to laser control 15 is achieved via photo-diode 31 and transimpedence amplifier 32 connected to laser control 15. Laser 14 emits an auxiliary beam over light path 30 to a photo diode 31. The path 30 beam may also be obtained, as is known, from a usual beam splitter(not shown) used in optics 11. Photo diode 31 varies the photo current amplitude in accordance with the laser 14 emitted light over path 30, as is known. In contrast to the FIG. 1 illustrated laser beam feedback, an early constructed embodiment used wasted light from a beam splitter (not shown) in optics 11. That is, light from such a beam splitter is partially sent to disk 10 and the rest leaves optics 11 with no use for recording or reading on or from disk 10. Some of this wasted light is directed to impinge on photo-diode to be fed back to laser control 15, all as is known. In either arrangement, transimpedance amplifier 32 responds to the diode 31 changed current amplitude compared with a reference value on line 33 to supply signals over line 34 indicative of laser 14 output beam intensity. Potentiometer 38 adjusts the gain of transimpedance amplifier for achieving a target read output power level. This adjustment effects a calibrated signal level on line 34 in volts per watts. As a result, the signal level on line 34 represents light power output level of laser 14. Laser control 15, under normal operations, responds to the signal level on line 34 to maintain the laser 14 operation at predetermined intensity values, as is known.

In accordance with an aspect of the invention, additional circuits are provided for processing the line 34 signal for enabling automatic calibration of laser 14 emitted power level and of DAC 23 such that numerical values on cable 22 accurately represent a desired light intensity output of laser 14. The description of FIGS. 2–18 illustrate usage of these and other additional circuits.

A first analog comparator 40 receives the line 34 signal at one input for receiving an indication of the laser 14 output light intensity. A reference value signal on line 41 indicates either a desired write or erase light intensity value or an overpower threshold value as selected by automatic switch 39. Switch 39 is set to the appropriate position by microprocessor 20 in a known manner. Switch 39 supplies the selected reference value signal a second input of comparator 40. Comparator 40 supplies an inactive signal over line 42, through OR circuit 40 an AND gate 55 to microprocessor 20 at all times until the signal on line 34 indicates that laser 14 is emitting a light beam equal to or greater than the selected reference value signal. To indicate the line 34 signal exceeds the selected threshold value signal, comparator 40 supplies an active signal over line 42 to microprocessor 20. Microprocessor 20 then selectively responds to the comparator 40 signal only during calibration processing. AND gate 55 is controlled by microprocessor 20 in a known manner for limiting the time it receives the output of OR circuit 54. Microprocessor 20 is programmed to selectively actuate switch 39 to select the write or erase terminals during a DAC 23 calibration, overpower threshold during usual operations to turn off laser 14 to protect the disk 10 and during described calibrations herein. It is to be further understood that the reference values supplied on the respective input lines to switch 39 can be changed by microprocessor 20 for achieving different purposes. During laser calibration, microprocessor 20 programming, as later described, changes the numerical value supplied over cable 22 to thereby cause DAC 23 to actuate laser 14 to diverse selected power levels for controlling output laser light intensity.

In accordance with one aspect of this invention, a power reference value (threshold 179 of FIG. 8) is selected for measuring the output power level of laser 14 by measuring the power of a laser test signal being recorded, as will become apparent. In one constructed embodiment, the length of the emitted laser test signal is measured by microprocessor 20 measuring the time (using a circuit shown in FIG. 18 and the like) that the line 34 signal exceeds the length threshold reference supplied over line 41 by switch 43. In other embodiments, amplitude of a readback signal is examined, duration of a readback signal is examined and intensity of emitted laser beam is measured.

Figure 17:
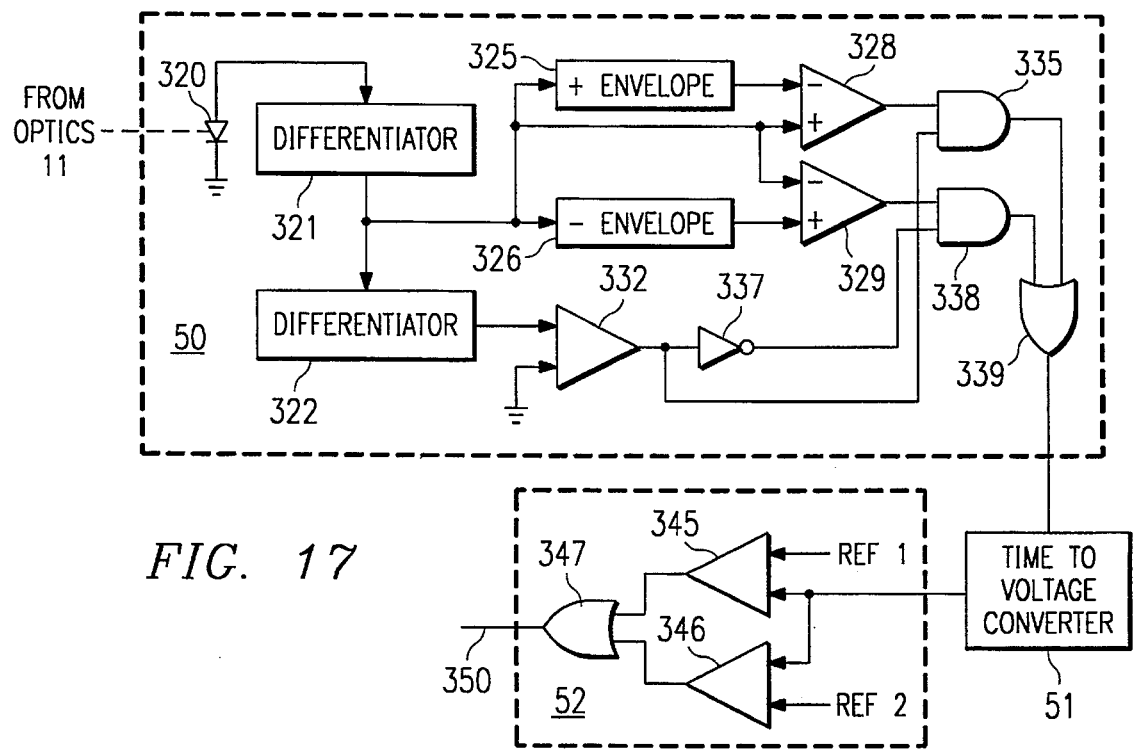
FIGS. 17 and 18 illustrate detection of emitted laser beam power level using the FIG. 13 illustrated measurement technique.

In one constructed embodiment, a power level detection window is established by FIG. 17 illustrated circuits by using an overpower threshold and an underpower threshold. If the signal is between the thresholds, then power level is appropriate. In another embodiment, the sensed analog signal, such as on line 34, is converted to a digital value. Microprocessor 20 then processes the digitized power indication using known comparison programming techniques. In yet another embodiment, a laser test signal written in a sector of track 122 is readback for measuring the power level of the readback laser test signal. Other variations can be envisioned.

To implement the last-mentioned embodiment, during laser calibration, time-to-voltage converter 51 (FIGS. 1 and 17) receives a detected readback signal from detector 50 to generate an analog voltage (FIG. 18) from an asynchronously detected data stream. Window comparator 52 (detailed in FIG. 17) detects whether or not the analog voltage lies between upper and lower threshold values for detecting acceptability of the emitted laser pulse width or duration. Such measurement on readback represent when the written laser test signal exceeds the indicated threshold values, including those indicated in FIG. 8 by numerals 166 and 179. The details of this calibration is better understood by referring to FIGS. 17 and 18.

It is to be understood that microprocessor 20 also controls all aspects of the illustrated optical disk recorder. For example, detector 50, which detects the data sensed from medium 10, is also controlled to supply the data signals over line 51 as is well known. Detector 50 includes an optical detector which is optically coupled through optics 11 to disk 10 in a usual manner.

Figure 2:
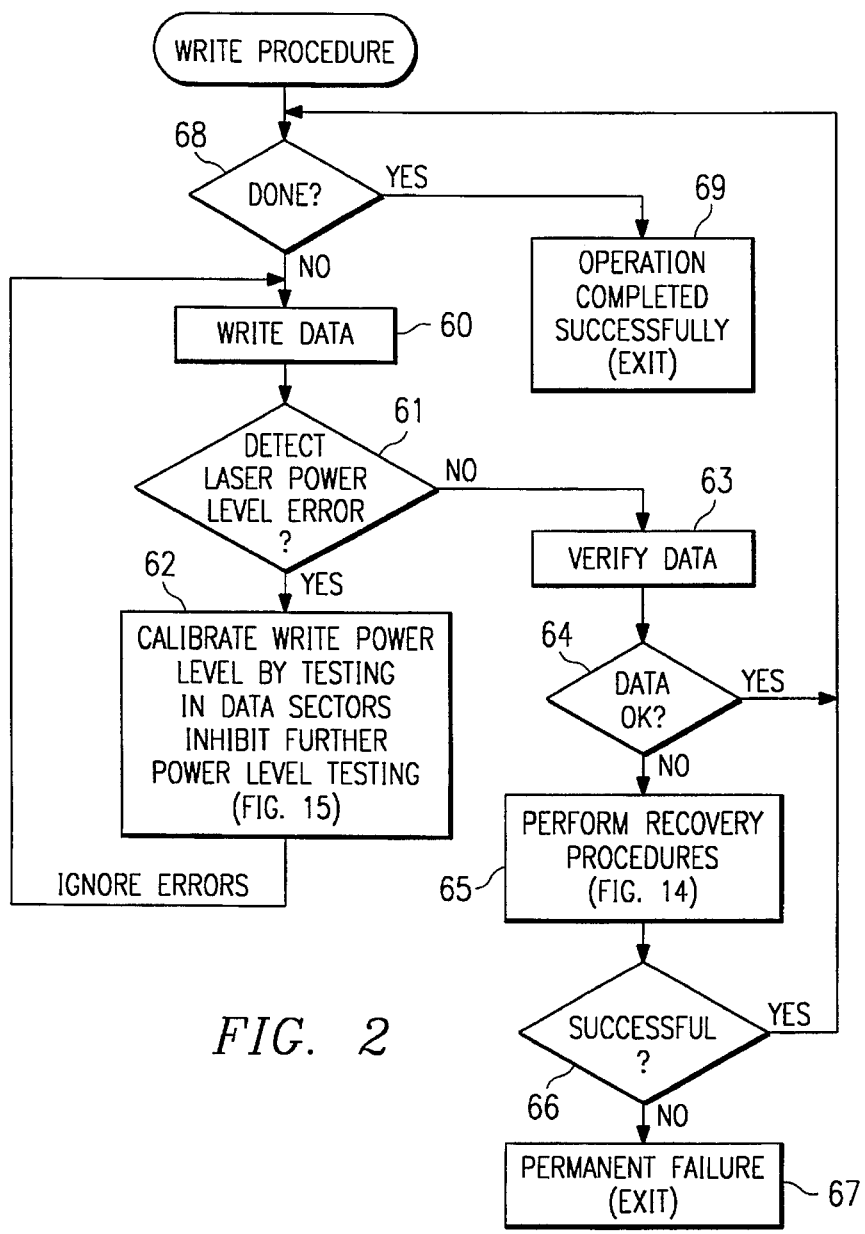
FIG. 2 illustrates the invention as an automatic laser calibration procedure in a simplified operation flow chart.
Figure 15:
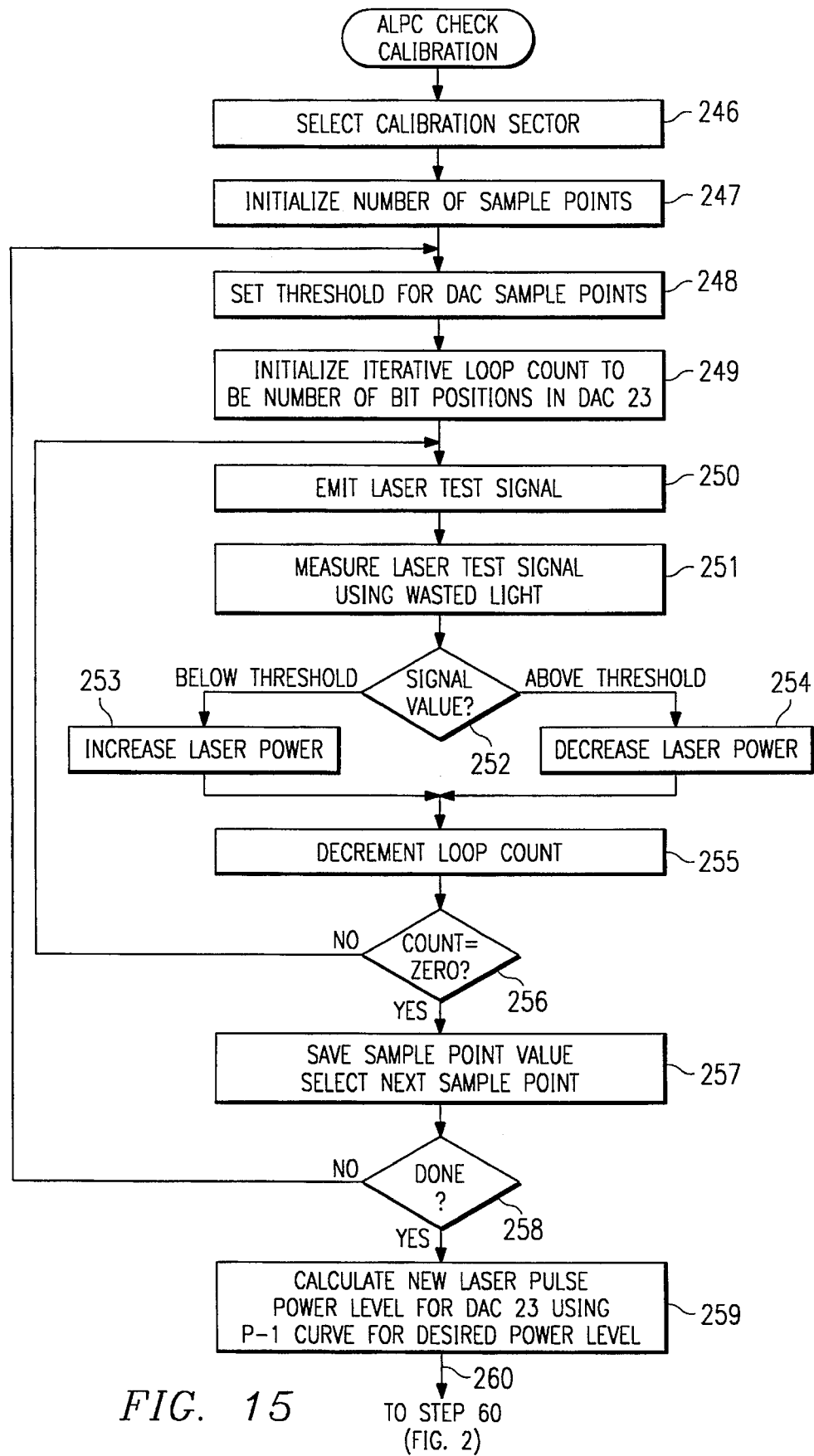

FIG. 2 is a simplified machine-operations chart illustrating certain aspects of the present invention occurring when writing to a write-once read-many (WORM) disk 10. Step 60 indicates generally that the FIG. 1 illustrated recorder initiates writing (recording) data onto WORM disk 10 in track 122. Step 60 includes performing a laser power level check in ALPC area 132 (FIG. 3) just before writing data into data area 133. Step 60 actuates laser 14 to emit a laser power level for writing a laser amplitude test pulse in ALPC area 132. If the laser power level is outside an acceptable laser power-level tolerance range (FIG. 13A), either less than low threshold 231 or greater than high threshold 230, then step 60 aborts writing data. If the laser test pulse power level is within the tolerance range, data are written to the optical disk. Such writing usually occurs in batches of data records, each recorded in diverse disk sectors (later discussed), each sector having a data storing capacity of 1024 bytes, for example. Step 61 responds to a step 60 detecting a laser-beam power within the tolerance range to proceed to data verification step 63. Otherwise, step 61 responds to a detected laser-beam power level error (power is outside the tolerance range) to proceed to step 62 for calibrating laser 14 as shown in FIG. 15. This calibration uses short (one or two data byte lengths in track 122, for example) later-described laser test signals in a data sector. Such data sector may be the target sector for receiving data to be written or may be any other data sector. The step 60 laser-beam power level detection is expected to occur before the first data record is written after any power up of the recorder, after a new disk 10 has been received by the recorder or after a periodic calibration that is a part of a schedule for accommodating ambient environmental changes.

In a first aspect, a laser write check area is provided in each data sector. In this aspect of the invention, the laser calibration proceeds either using ALPC field of one or a plurality of sectors and may be interleaved between data writing, as will become apparent. In a second aspect, a plurality of the short laser test signals may be written in a predetermined spaced-apart relation in a WORM data-storing area. During such writing, the wasted emitted laser 14 light is sensed by photodiode 31 for detecting laser emitted beam power while writing the laser test signal. After the laser power level calibration, step 60 writes data to this same data-storing area. No additional laser power level error test is required. A suitable error detection and correction code redundancy is used to correct errors induced by the recorded laser test signals. Such recorded laser test signals appear as burst errors during reading the recorded data. Included, in this aspect, is recording one or a small number of laser test signals in a plurality of data storage areas in the span of one sector such that the burst error phenomenon is reduced by spreading the test signal burst areas in a plurality of error correction interleaves in an ECC data array.

After data are written, if no laser power level error was detected by step 61 or following laser calibration(step 62) and rewriting the data in step 60, then in step 63, the recorder checks to see if the data correction (using data error correction code redundancy) is successful (OK). If yes, then writing continues in step 60 without further calibration activity. If not, then step 65 performs, in step 65, recovery procedures of FIG. 14 that may include generating a later-described write calibration sector (WCS) of FIG. 16 in which a plurality of laser calibration activities occur. Such recovery procedures include calibrating DAC 23, such as described in the document incorporated by reference U.S. Pat. No. 5,185,733). Step 66 determines whether or not the recovery procedures are successful. If yes, then writing data resumes in step 60. Otherwise, the current write operation is aborted and an indication is sent to the write-requesting host indicating that the current device (FIG. 1) could not successfully write data to the WORM disk mounted in that device.

In a another aspect of this invention, a plurality of laser short laser test signals are recorded in one data sector. The spacing of the laser test signals, shown in FIG. 11, enables error detection and correction of burst errors in the data recorded in such data sector AFTER the test signals are recorded. The operations for recording such plurality of laser test signals follows the above description as modified by the FIG. 11 description.

Figure 3:
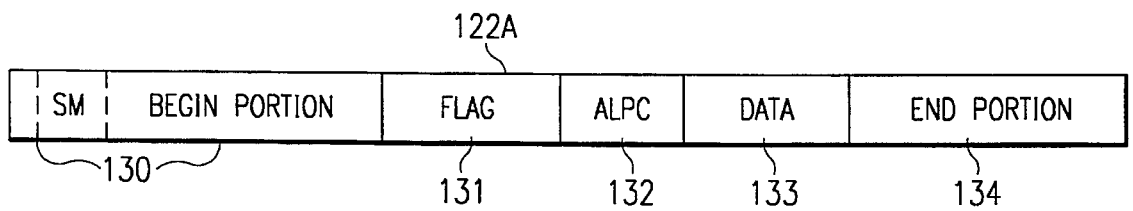
FIG. 3 diagrammatically illustrates a format of a sector of a disk used in the FIG. 1 illustrated optical disk recorder.

FIG. 3 diagrammatically shows, in a simplified form, the format used for each one of multiple addressable sectors in track 122, a single spiral track on disk 10 (FIG. 9). The term "track" also includes each circumvolution or rotation of the single spiral track. That is, each such circumvolution is defined as a "substantially concentric track". Begin portion 130 includes the usual clock synchronizing signals plus identification signals for the sector. In one embodiment, begin portion 130 starts with a usual sector mark SM, then a first clock synchronization but termed VFO1(variable frequency oscillator burst type one) followed by a usual first address mark (AM). A first sector address identification ID1 follows the first AM. Then a second clock synchronization burst VFO2, second address mark AM and second sector identification ID2 follow. A third repetition of the clock sync, AM and ID1 cluster follows. Other usual control fields are also used. A gap, represented by the vertical line between begin portion 130 and flag field 131 separates portion 130 from flag field 131. A similar gap separates flag field 131 from two-byte ALPC field 132.

The present invention uses ALPC field 132 in a new and novel manner. ALPC field 132 circumferentially abuts data field 133. Data field 133 starts with a fourth clock synchronization burst termed VFO3 followed by a usual data-bit synchronization (sync) signal then recorded data. One or more resynchronization signals (RS) 207 may be interleaved between data recorded in store field 206. Some internal details of data field 133 in a WCS sector are shown in FIG. 12. End portion 134 includes usual error detecting correcting redundancies, such as cyclic redundancy check signals and error correcting signals, as is known. A gap, not shown, separates adjacent sectors, i.e. between end portion 134 of one sector and begin portion 130 of a next adjacent sector.

Figure 4:
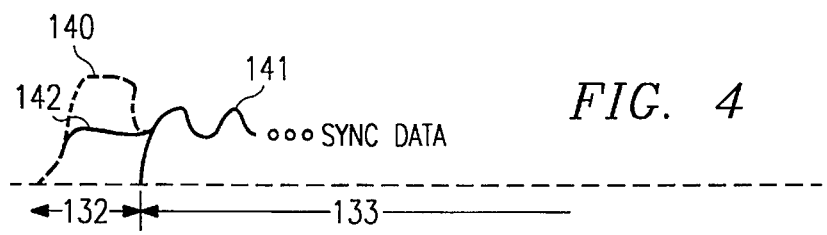
FIG. 4 graphically illustrates an effect of recording a laser test signal in an ALPC area of a data sector.

FIG. 4 illustrates the signal interference effects of prior art laser power recorded signal 140 in ALPC 132 with respect to the data clock synchronization burst VFO3, indicated by numeral 141. Laser 14 beam power is measured by microprocessor 20 receiving the photo-diode 31 supplied signal while the laser is emitting a constant write intensity beam as the laser test signal being written in ALPC field 132. Note that the emitted beam power indicates a write pulse having a predetermined power for a predetermined period of time (empirically determined). Laser 14 emitted constant high intensity (DC) laser power test beam over ablates ALPC 132 resulting in a trailing edge of recorded laser test signal 140 circumferentially extending to data field 133. As a result, a negative effect on the readback circuits (not separately shown) in data detector 50 can cause errors in delayed clock synchronization because of the high amplitude DC laser test signal 140. Accordingly, a close overlapping string of write pulses are recorded in ALPC 132 resulting in recorded write-pulse PWM laser test signal 142 that does not extend to data field 133 nor produces a high amplitude DC readback signal. The resultant reduced amplitude and less encroachment toward data field 133 provides faster and more reliable clock synchronization in data field 133.

Another negative effect of over-ablated test signal 141 is the erosion of the groove radially. This erosion can cause erroneous counting track grooves required during a track seek. This count error results in the track seeking to an unintended spiral track circumvolution rather than to the target circumvolution. The present invention obviates this additional risk.

It is also desired to measure laser beam power level while the laser 14 emitted beam is focussed on the recording layer of disk 10 (track 122). It is usual practice to measure laser beam power while the laser beam is defocussed so as not to ablate disk 10 write-once recording surface. ALPC fields 132 in the various sectors are used for adjusting laser beam power as a result of performing a data recording or write operation, while the beam is focussed for writing and without using any data storing sectors nor accessing a sector separately from a write operation.

Figure 5:
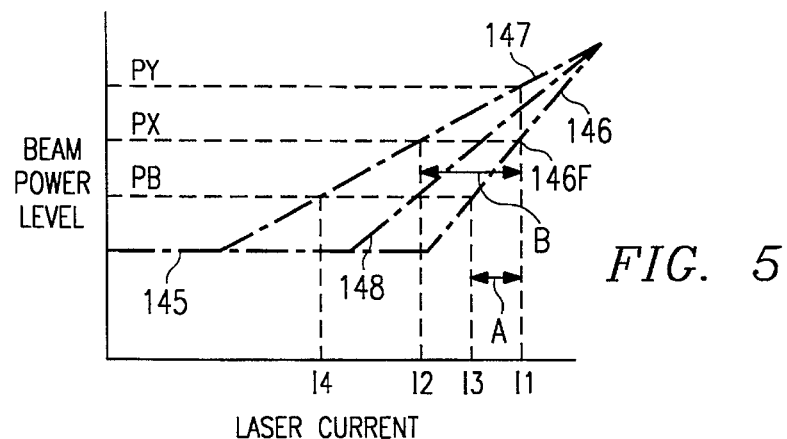
FIG. 5 graphically illustrates relationships between laser drive current and laser beam power in different focus conditions.

FIG. 5 graphically illustrates a relationship of an emitted laser beam power with respect to laser current at both in-focus and out-of-focus conditions. Horizontal line 145 indicates minimum lasing power for laser 14. Line 146 indicates the change in beam power level with laser current in an out of focus condition. This line represents operation of the laser when calibrating a laser using an out-of-focus beam. Line 148 indicates in-focus beam using 1% feedback. Line 147 indicates in-focus beam using 2% feedback. Point 146F indicates a possible calibration of laser 14 emitted beam power level in an out-of-focus calibration. Because the P-I (power-current) curve of laser operation shifts with focus (due to optical feedback), the required laser drive current to produce a given emitted laser beam power changes both in absolute current required to obtain the given emitted laser beam power and in differential current amplitudes above a so-called baseline power level. For example, if the laser power servo control operates to keep the laser at some baseline threshold when not writing data, than an out-of-focus write calibration for obtaining power Px yields a calibrated pulse current of:

$$a = I1 - I3. \quad (1)$$

Equation (1) is not accurate for an in-focus condition that requires a pulse current of:

$$b = I2 - I4 \quad (2)$$

to achieve the same desired laser power level.

In equations (1) and (2) "a" and "b" respectively represent the laser drive currents in out-of-focus and in-focus laser beam conditions. I1–I4 are current amplitudes shown in FIG. 5. Further, the current amplitudes I1 and I2, because of feed back, have different absolute values, for achieving identical emitted laser power levels in the out-of-focus and in-focus conditions, respectively. Therefore, it is important to calibrate a laser write power level when the beam is in focus at the recording layer of disk 10.

Figure 6:
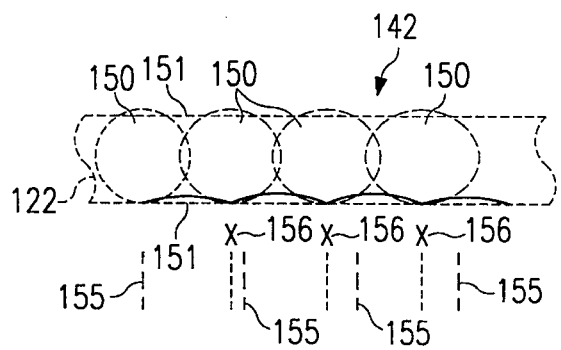
FIG. 6 diagrammatically illustrates a write pulse-generated PWM signal recorded in a write-once track of an optical medium as generated by the FIG. 1 illustrated optical disk recorder.

FIG. 6 diagrammatically shows a recorded write pulse-generated PWM laser test signal 142. Again note that the laser beam power level is measured by photo-diode 31 using wasted light from optics 15 during the time ALPC field 132 test signal is being written. A portion of track 122 is indicated by the two horizontal dashed lines (unnumbered). Numeral 150 indicates a series of write intensity laser beam recorded "dots" that overlap longitudinal of track 22 that is a write-pulse-generated PWM laser test signal. The recorded "dots" are about the radial width of track 22 (dots 50 can be smaller in diameter and still be used to practice the present invention). The resultant recording, because of thermal effects, creates a write-pulse-generated PWM laser test signal 142 (FIG. 6) indicated by wavy lines 152. Usually, the recorded write-pulse-generated PWM signal, when sensed, results in a readback signal envelope that has a minor modulation component. This write pulse-generated PWM signal results in signal 142 of FIG. 4. An advantage to the write-pulse-generated laser test signal is that the test signal replicates use of a data recording operation as opposed to the extended time DC maximum peak signal of the prior art.

The FIG. 6 illustrated PWM signal is generated using the known write control by microprocessor 10 of laser 14 via DAC 25 and laser control 26. Data flow 11 supplies write-clock timed pulses to a laser control 26 to gate the DAC 25 laser level to laser 14. The timed pulses are generated by a usual write clock (oscillator, not shown) in data flow 11. As usual, the write clock emits a timed pulse once each bit period, i.e. defines a bit period. Either a binary one signal or a binary zero signal is "recorded" in each bit period. A binary zero signal is no ablation in track 22 while a binary one signal is an ablation (also termed a "pit"). The bit periods are selected to ensure that the recorded 1's do not overlap, either by duration of the bit period or by coding that avoids two one's from being recorded in adjacent bit periods. If a (2,7) code, for example, is used, then no adjacent bit periods each have a binary one signal, in fact, each binary one signal is separated from an adjacent binary one signal by two binary zero signals. In this instance, to create the PWM signal 142, the (2,7) code is ignored by recording a binary one in each of a succession of bit periods. Alternately, binary one signals may be recorded as every other signal to create a one-zero string of 10101010 . . . In such recording, the recorded binary ones result in overlapping ablations as seen in FIG. 6. It is to be noted, that the circumferential length of such ablated pits vary with radius when using a constant duration bit period. On the other hand, a recording system may employ timed write pulses that result in spaced apart ablated pits, such as represented in FIG. 6 by hash marks 155 that respectively indicate successive bit period centers. Successive recorded one signals then will not create a PWM signal. As an example, a (2,7) data pattern of 1001001001 (each 1 indicates a pulse to be recorded) can be used to produce recorded dots 150 that do not overlap, i.e. are separated along the length of track 22 as represented by numerals 155. Changing a (2,7) code data pattern to 101010101 results in the recorded dots 50 to overlap to produce the PWM signal 142. Such recording controls are preferably programmed controlled by microprocessor 10. Such program control may include a DAC set by microprocessor 10 to select a bit period to be used in recording. The actual laser 14 write-intensity beam power level at the surface of disk 10 is measured by measuring the length of a recorded write-pulse-generated PWM laser test signal 142 (FIG. 4), amplitude (FIG. 13), or a readback signal (FIGS. 17 and 18), and the like.

Figure 7:
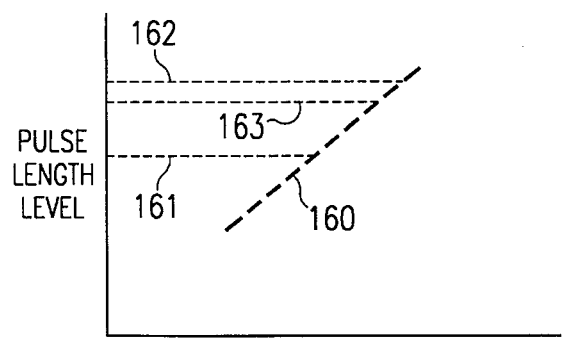
FIG. 7 graphically illustrates a relationship between pulse widths and laser beam power as used in the FIG. 2 illustrated apparatus.

FIG. 7 illustrates the linear variation (within the operating range of write recording beam power levels (intensities) of pulse length with changing laser beam power level. Line 160 illustrates the linear change in pulse duration (length) as beam power level changes. Line 161 indicates a 10% low power level. Line 163 indicates optimal write-beam power level for recording. Line 162 indicates a peak power level greater than optimal for desired recording. Because the higher power pulse amplitudes rise and fall in the same time duration as lower power pulses, the effective length of the recorded pulses are longer, as best understood with respect to FIG. 8.

Figure 8:
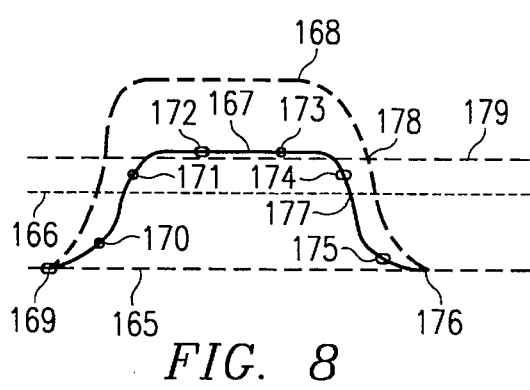
FIG. 8 graphically illustrates measurement of the length of a laser test signal of the pulse-width-modulated type.

Readback laser test signal (pulse) 168 of FIG. 8 illustrates a PWM pulse generated at the optimal power level. The shape of readback PWM pulse 167 is determined by measuring amplitudes at a sequence of points, such as indicated by numerals 169–76. Points 172 and 173 together measure the amplitude of PWM read-back pulse 67. Measurement points 170 and 171 combine to define the slope of the leading edge while measurement points 174 and 175 combine to define the trailing pulse slope. Interpolating between the slope indicating points (70,71 or 174,75) locates the time at which the 50% threshold 166 amplitude is exceeded. The 50% threshold 166 value is calculated by halving the sum of the values indicated as the baseline level at 169 or 176 plus the PWM amplitude value indicated by points 172 or 173. The elapsed time between the leading and trailing edges 170–71 and 174–75 at threshold line 166 indicates pulse length. Increasing the peak amplitude of the pulse as shown by pulse 168 results in a greater length pulse measured by the respective times that PWM threshold 179 is crossed by readback PWM signal 167, as can be easily seen in FIG. 8. At the trailing edge, numerals 177 and 178 indicate the increase in pulse duration or length as caused by increased pulse peak amplitude.

Before using the recorder, such as during manufacture or before, these PWM pulse durations are calibrated to an empirically determined optimal laser power level for enabling calculating relative laser power level used to create the recorded pulse. For example, a first WORM disk may require eleven milliwatts for optimal recording. A PWM pulse 168 recorded at ten milliwatts on this first disk results in a recorded PWM signal that is too short. If the pulse width to relative power is calibrated, it than can be calculated by the time measure that such PWM pulse was recorded below optimal power level. Conversely, if the recorded PWM signal is too long, that indicates the optimal power level is lower. This measurement is used for each individual disk for obtaining optical recording on each and every disk. This principle is used in the present invention. Measuring the duration or length of the readback write-pulse-generated PWM laser test signal yields the relative laser beam power level that recorded the pulse (same in-focus condition).

Accordingly, during a first data write operation (write command execution) during any recording session on a write-once disk or upon detecting a write error, the ALPC field 132 recorded laser test signal 142 is measured, as seen in FIG. 8. Then microprocessor 10, using a table lookup generated as set forth above and stored in microprocessor 10, calculates power level. To practice the present invention, quantitative analysis of the write-pulse-generated PWM signal is not required. A desired length for the write-pulse-generated PWM signal is predetermined and stored in an internal memory of microprocessor 10. If a measured length of the write-pulse-generated PWM signal is greater than the desired length, then laser power is decreased.

Figure 13A:
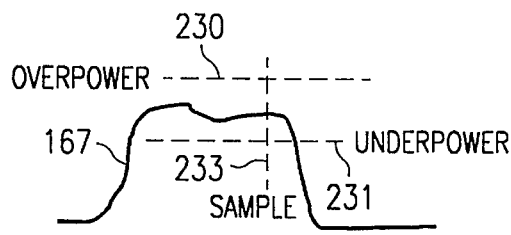
FIG. 13A schematically illustrates amplitude detection scheme for detecting whether or not the emitted laser beam is at an appropriate write power level.

FIG. 13A diagrammatically illustrates amplitude detection of a desired emitted beam test signal, rather than the FIG. 8 illustrated pulse length measuring technique, for calibrating the DAC 23 write pulse level. This detection method is used for in-focus DAC 23 calibration checking. Measuring length of the emitted laser write pulse beam requires two passes over the test area in which the ALPC test signal is written. It is desired to test the ALPC test signal and write data in the sector in one pass. To accomplish ALPC testing and data writing in a single pass it is necessary to sense the emitted laser beam, which is not truly readback because ablation is occurring. If read while write or read after write optics are provided, then the single pass may be achieved sensing the readback signal. Numeral 187 indicates the emitter laser beam used to write the test signal in an ALPC field 132 of a data sector (not necessarily WCS). The overpower level 230 is detected by comparator 40 when switch 41 is set to the overpower threshold. This setting is done automatically by microprocessor 20 just before ALPC 132 is to be scanned. Similarly, the under power threshold signal level 231 is applied to comparator 35. Amplitude sample time 133 is set by microprocessor 20 to occur in a trailing portion of the emitted laser beam test signal, such as just before an expected trailing end of emitted laser beam test signal 187 occurs. An active signal from either comparator 35 or 40 indicates an out of range emitted power level. Microprocessor 20 responds to such a signal for corrective action as explained herein. If no active signal is supplied, then data writing ensues.

FIG. 9 is a simplified plan view of disk 10. Disk 10 rotates about axis 10A. The FIG. 1 recorder has a usual head carriage (not shown) for relatively positioning disk 10 and objective lens 12. Single spiral track 122 is represented by a single circle. A radially inner portion 180 of track 122 is a so-called manufacturers area. Such area, having a given number of recorder addressable data sectors, is reserved for system use (no user data is recorded here). The FIG. 12 illustrated WCS can be recorded in portion 180.

FIG. 10 diagrammatically illustrates a series of multiple-byte long laser write power level calibration signals having respective diverse amplitudes with respect to baseline 165. Each numerals 185–191 represent a readback signal envelope read amplitude using a fixed readback gain (AGC off) at increasing write laser beam power levels increasing from numeral 185 toward 191. The different readback signal amplitudes respectively indicate the different emitted laser beam power levels used to write the test signals (185–191) increase in intensity from left to right. The FIG. 10 illustrated signal may also be a continuous stepped amplitude signal, a series of narrow pulses in which groups of the pulses have like amplitudes with the amplitudes being stepped between groups, etc. Each such test signal is typically written on successive rotations of disk 10, i.e. successive passes over the area in which the test signals are being written. As described above, the resultant laser test signal having an appropriate power level is selected as the desired laser power level. When using a series of laser test signal amplitude, the written signals are readback with the amplitudes being measured. Then by known polynomial curve fitting techniques (interpolation), the laser drive current is selected to produce a desired output write signal, such as one that results in a maximum readback signal amplitude. FIG. 13A, described above, illustrates measuring power level by measuring amplitude at a predetermined position of the signal.

FIG. 11 illustrates data field 133B in which a plurality of laser test signals 195 have been recorded in spaced-apart relationship. Test signals 195 each are of a one-to-two byte length. After using the test signals for laser power calibration, data are written into data field 133B. Error detection and correction data ECC are recorded in end portion 134. Such error correction data or information are preferred to be generated using the well known Reed-Solomon codes. In such written data, the laser test signals 195 appear as one-to-two byte duration error bursts. If the error bursts appear in different error syndromes of the ECC, then as is known, such burst errors are corrected making the data readable. Therefore, a data area 133B, in a write-once disk 10, can be used both for laser calibration and for recording data. It is known and a matter of design choice how the error-correcting syndromes are generated. Such syndromes determine the format arrangement of data stored on disk 10 based upon a correction data array of the error correcting code that was determined by the known H-matrix of the code. H means Hamming. For example, if four errors in four syndromes can be corrected with code error pointers (four other syndromes), then with error pointers generated outside the correcting code structure enables correcting eight errors. Often the code-exterior code pointer are generated based upon detecting readback signal errors. Such detected readback signal errors are error pointers that point to the syndromes for the data in error. According, if six test signals are written in data storing portion 133B, then by detecting readback signals errors, all six test signal caused burst errors are correctable with a margin for two additional errors to be corrected. In this manner, the calibration test signals do not prevent usage of the data storing portion(s) used for later data recording. However, if the data recorded in such calibration employed sectors is not correctable, then data intended for such sectors are reassigned to other sectors. As such, the reassignment sector is a back up for the data written in the FIG. 11 illustrated sector. Such reassignments are well known and not further discussed herein.

FIG. 12 diagrammatically illustrates an exemplary write calibration sector WCS. Each WCS is written in successive passes of the laser beam over WCS. In the illustrated WCS, laser write power is calibrated to achieve a maximum readback signal amplitude as taught in document incorporated by reference U.S. Pat. No. 5,185,733. Note that U.S. Pat. No. 5,185,733, in its described embodiment, requires plural tracks for calibration in a magneto-optical disk system. It has been found that calibrating write laser power to maximum readback signal amplitude can be achieved using successive approximation is less that ten tries. The sequence of analysis is the same as in said U.S. Pat. No. 5,185,733 excepting that the calibration signals are about 100 bytes long in the successively written portions CAL 1–8 field 209. Each calibration signal of about 100 bytes is separated by a four byte gap. It is preferred that a (2,7) code pattern 1001001001 . . . be recorded in the CAL portion of WCS. After calibrating the laser to produce a write signal resulting in a maximum amplitude readback signal in CAL 1–8 field 209, the FIG. 1 recorder is ready to record data.

The data concerning the above described laser calibration in WCS may then be recorded in field STORE 206. Such data may include desired emitted laser write pulse duration (width), DAC 23 calibration data as described in U.S. Pat. No. 5,185,733, identification of the FIG. 1 recorder (serial number, etc) and the like. SYM field 205 is a clock synchronization mark. VCO3 is a recorded clock synchronization burst. Field RS 207 is a clock resynchronization byte. Note that the fields 215 through CAL 1–8 are written in successive passes of the laser beam over WCS. The resultant recorded signals may abut (small unwritten gaps may exist between adjacent signals). The CAL 1–8 fields can be written in any sequence, i.e. CAL 8 can be written first or CAL 1 can be written first, etc. The fields 132 through 207 are written beginning with ALPC, then writing the clock synchronized data. The test patterns are not clock synchronized by VCO3 203.

It is preferred that WCS is written in the manufacturers area 180. Most WORM disks have a so-called reassignment area. WCS can be written in one of the sectors in the reassignment area. Of course, other sectors may also be used. Creating and using WCS can be initiated from a write verify error or by a command from microprocessor 20 independently of a detected error. As a variation of the above-described WCS, calibration of DAC 23 may be achieved using the techniques of said U.S. Pat. No. 5,185, 734 can be used. Such calibration should use the record-read sequence procedures set forth in FIG. 16 for calibration described in U.S. Pat. No. 5,185,733.

Figure 13B:
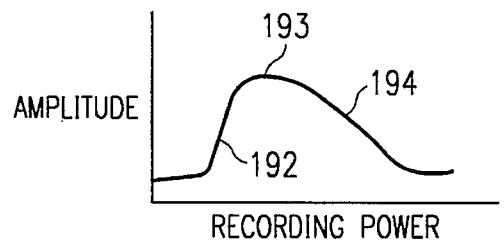
FIG. 13B illustrates an amplitude detection scheme for measuring laser beam power rather than the FIG. 8 illustrated pulse-length measurement scheme.

FIG. 13B shows the relationship between readback signal envelope amplitude with respect to laser beam recording power levels used to produce readback amplitudes 185–191, for example. This graph shows that as recording power increases (power level produced readback amplitudes 185–187), there is a relative sharp increase in readback signal amplitude, as at 192. The amplitude peak 193 tends to be relatively flat (power levels used to produce readback amplitudes 187–189). As recording power continues to increase (power levels 189–191), readback amplitude tends to trail off, as at 194. In area 192 the quality of write-once ablation tends to be poor. That is, bubbles may be formed in the recording surface rather than the desired "pits". The above described curve is known to be valid for test recording patterns 1001001 for (2,7) and 10101 for (1,7) recording codes, respectively.

Figure 14:
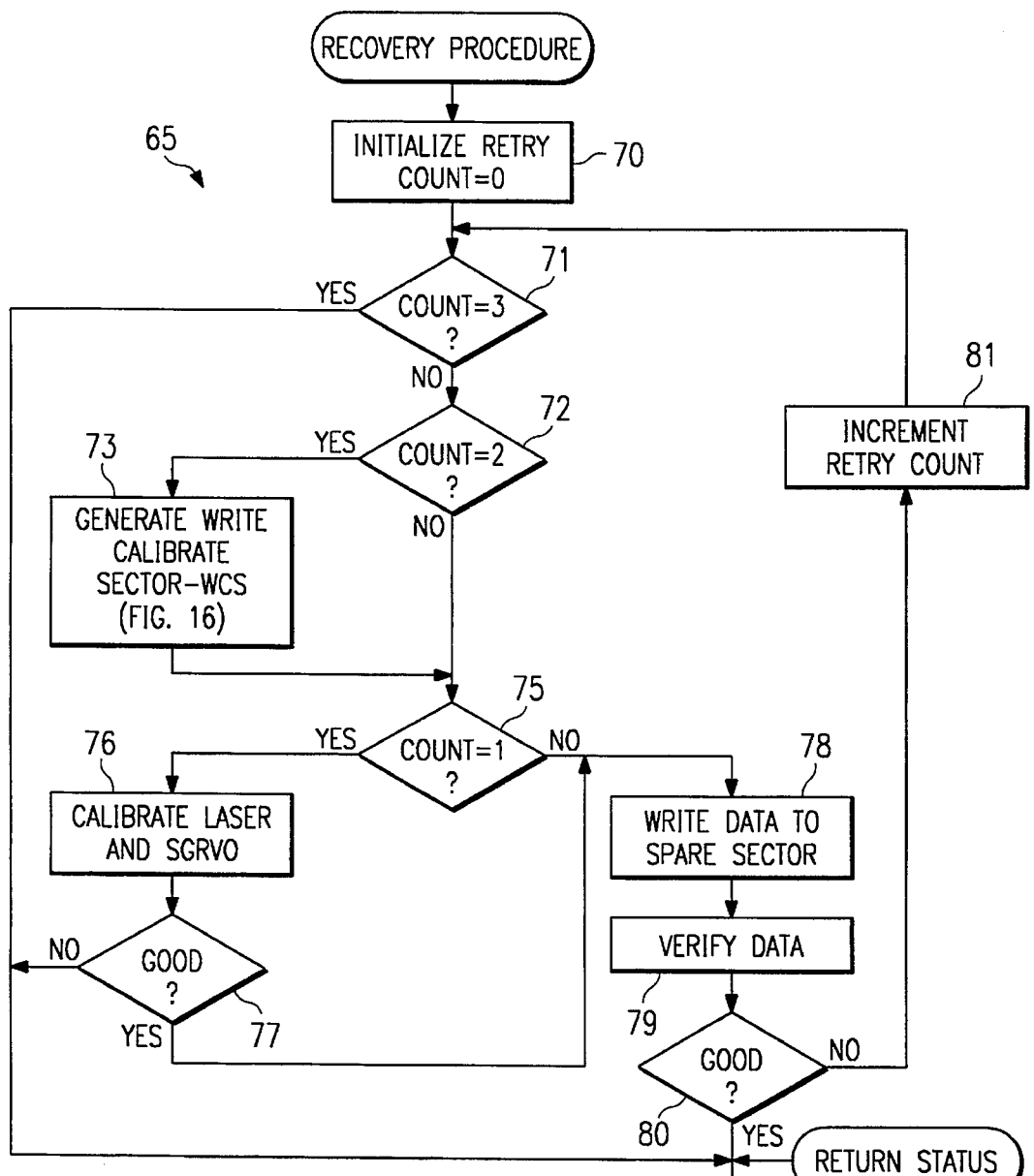
FIGS. 14–16 are operation flow charts illustrating practicing the invention in the FIG. 2 illustrated apparatus.
Figure 16:
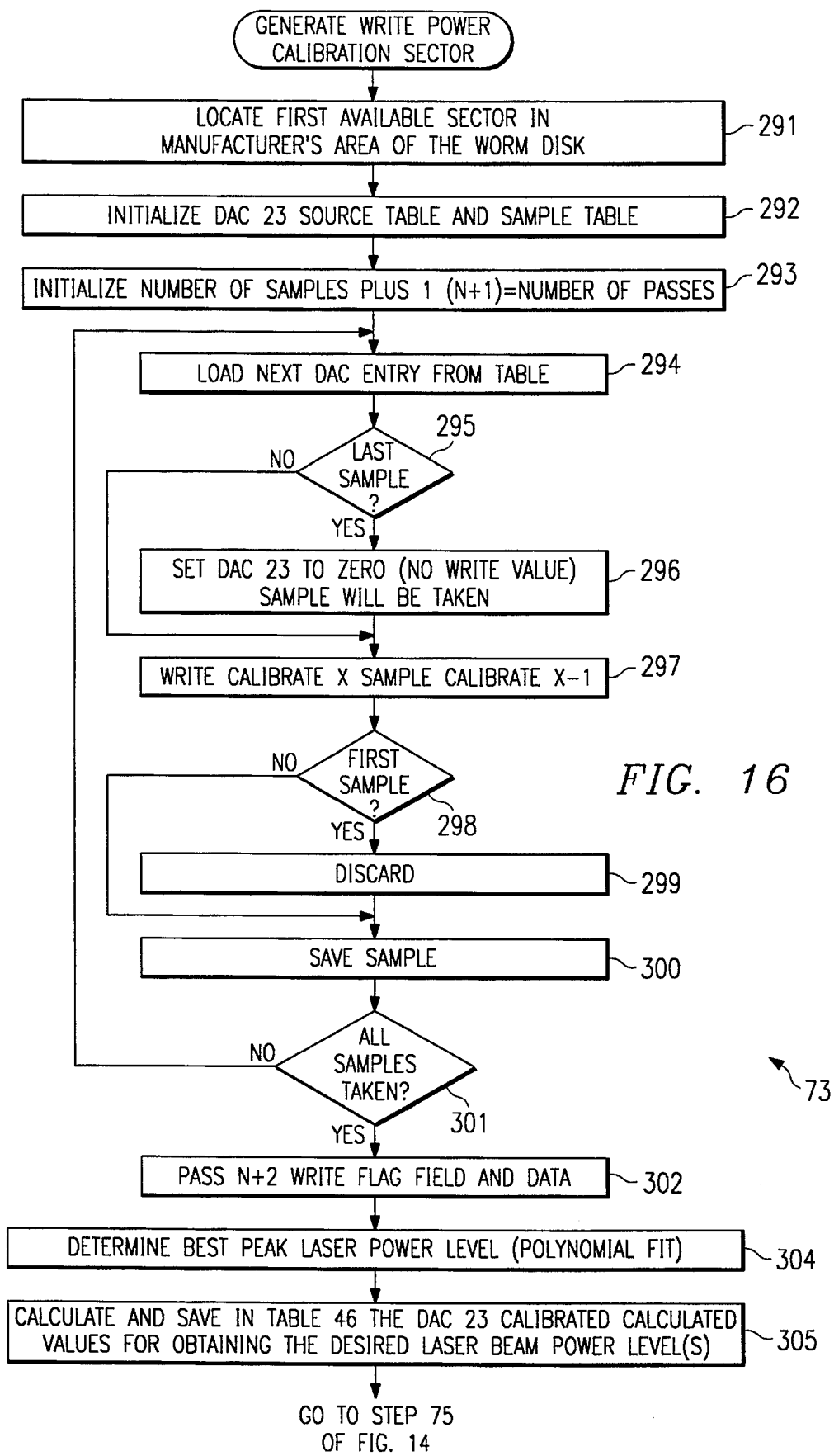

FIGS. 14–16 are detailed machine-operation charts showing practicing the invention using the above-described apparatus and data structures. FIG. 14 is a simplified machine-operations chart showing internal operations of step 65 (FIG. 2), recovery operations. The first recovery step 70 initializes a retry count (not shown) to zero. The retry count maximum is three for enabling three retries of the failed operation for attempting to obtain a successful operation. In this recovery procedures, different calibration operations are performed at different retry counts. Step 71 examines the retry count for determining if the max count is three. If the retry count is three, then recovery has failed resulting in the FIG. 1 illustrated device proceeding to step 66 (FIG. 2) for reporting failed status to a connected host (not shown). Any additional recovery operations beyond the described automatic procedures is not described.

If in step 70, the retry count is less than three, then step 72 examines the retry count for determining whether the count is two. If the count is less than 2, as in the first pass through the procedure, then step 75 examines the retry count for equaling one. Since in the first pass through the recovery procedure the retry count is zero, steps 78–80 are performed. Step 78 writes the data to a spare sector. Such spare sector can be any unused sector. Selection of spare sectors are known and not detailed herein. After step 78, the data written by step 78 is read back in step 79 for verifying the success of the writing. Such verify readback is known. Then, if at decision step 80 the verify indicates that the spare sector stored data is readable (return good status), then the recovery procedure is exited to step 66 (FIG. 2).

If step 80 finds that the step 79 verify operation was not successful, then additional recovery operations ensue. From step 80, the device operations proceed to step 81 that increments and stores the retry count, now equal to one. Then steps 71, 72 and 75 area repeated. In this second pass, since the retry count is equal to one, from step 75 calibration step 76 is performed. This calibration calibrates the servo positioning system (not shown) and the laser of the FIG. 1 illustrated device. The laser calibration is a usual out-of-focus calibration and may include calibrations shown in the documents incorporated by reference, for example. The servo positioning calibration can be any known calibration technique for calibrating optical disk head positioning (seek and follow operations) system. In any embodiment all or any one or more of the mentioned or other calibrations may be performed. Upon completion of the calibrations, step 77 examines the calibration results to ascertain whether the calibrations are successful (good). If the calibrations are not good, then operations proceed to step 66 of FIG. 2 for indicating failed status. If at step 77 the calibrations are all good, then steps 78 et seq are repeated as above described.

The recording results in step 78 effected during the second pass are checked in steps 79 and 80. If the recording is not good, the step 81 increments the retry count to two for initiating a third pass through the recovery operations. In this third pass, step 72 responds to the retry count being two to initiate step 73 to perform the FIG. 16 illustrated step 73 "generate write calibration sector" operations. These operations are a comprehensive calibration of the laser. Upon completion of step 73 operations, steps 75 and 78–80 are performed. If the recording in step 78 is not good, then step 81 increments the retry count to three for actuating step 71 to return failed status to step 66 of FIG. 2.

FIG. 15 details the operations conducted within step 62 (FIG. 2) of calibrating laser write power level by using data sectors that later store data. Such calibration uses the FIG. 8 or 13A illustrated laser test pulse. The FIG. 15 illustrated machine calibration operations are initiated by detection of either an ALPC check failure (error) or by a diagnostic command. Step 246 selects a data sector in which to calibrate the laser power level. As shown, such sector is the current sector to be written to, no limitation thereto intended. The FIG. 15 calibration adjusts the laser 14 current amplitude until signal 167 amplitude (FIG. 13A) is at the under power level 231 (FIG. 13A) on line 36(FIG. 1).

Step 247 initializes the number of sample points required for evaluating the laser test pulse. In the present embodiment, at least two sample points are used. Two sample points are required to determine the slope/intercept values of signal 167 of the power-current (P-I) curve 147(FIG. 5). The line equation enables the FIG. 1 illustrated device to set a correct laser current amplitude for any desired laser output beam. Step 248 initializes under-power threshold 231(line 36 of FIG. 1) (the over-power threshold 230 may also be used).

This calibration, for each of the sample points is an interactive process. The number of required iterations depends on the number of significant bit positions in DAC 23 (FIG. 1). Step 249 initializes an iteration counter (not shown) to the number of significant DAC 23 bit positions. Step 250 emits the laser 14 laser test pulse. Simultaneously, step 251 samples the emitted laser test pulse using wasted light, such as seen in FIG. 1. Step 252 compares the measured light value with the underpower threshold. If the threshold is not exceeded (crossed) (below threshold), then step 253 increases laser power by a predetermined change in amplitude that can be empirically determined. If the threshold is exceeded (above threshold), then step 254 decreases laser power by the predetermined change in amplitude. It is preferred that each predetermined change is such to adjust one of the DAC 23 bits at a time proceeding from most significant to least significant. Then the predetermined change is a one-half change in the emitted laser power, either increase or decrease.

Step 255 then decrements the iterative loop count in the iteration counter by unity. Step 258 compares the decremented count with zero. If the decremented count is not zero, then steps 250 through 255 are repeated for the next less-significant DAC bit position. If step 258 finds the decremented count equalling zero, then step 257 saves the sample point multi-bit value and selects a next sample point to be measured. Step 258 determines whether all of the sample points have been measured. If not (NO), then steps 248 through 257 are repeated as set forth above. If all of the sample points have been processed, step 259 performs calculations to derive an in-focus laser DAC power versus current (P-I) curve. From the in-focus P-I curve, a new laser current DAC value is set to achieve desired power for write operations. The operations then leave at line 260 for returning to step 60 of FIG. 2.

FIG. 16 details the operations of step 73 in the recovery procedure shown in FIG. 14. The FIG. 16 illustrated calibration operations may also be initiated by a diagnostic command of microprocessor 20. First it is assumed that appropriate laser 14 beam power has been set up, such as above described for beam intensity qualification using ALPC field 132 in accordance with the stamped values on disk 10. As such, it is not necessary to further qualify the laser 14 write beam intensity on the new WCS nor subsequent sectors. It is also assumed that a free sector is identified and accessed by step 291 as described below.

If the WCS is written in the manufacturers area 180, then each WCS is written at the trailing-most sector (last scanned) in such manufacturers area. That is, the data area is radially outward from manufacturers area 180. Such data area begins with track 0 sector 0. The spiral groove of disk 10 is continuous and includes both the data area and manufacturers area. The sector and track numbering in the manufacturers area is negative with increasingly negative numbers proceeding radially inward—i.e. the largest negatively numbered track and sector number is scanned first in step 291 such that increasingly positive sector and track numbers are scanned. Therefore, ignoring any other writing in the manufacturers area 180, a first WCS is written at track −1 sector −S, where S is an integer. Using this procedure, to select a WCS, the recorder begins scanning the negative numbered sectors and tracks beginning at the radially inwardmost sector (largest negative numbered track) and scans until a written sector is detected. Then, the next larger negatively numbered sector is selected to be the WCS sector. Also, the first scanned written WCS sector is also the last or most current WCS sector.

Step 292 initializes a laser current DAC source table in table area 46 (FIG. 1) using values to be used in successive passes over WCS as later described for achieving a desired distribution of resulting data amplitude levels as shown in FIGS. 10 and 13B. It is preferred that no less than three values be generated. In the successive passes, a leading portion of WCS portion 133 (over SYM 205 through G2 208) laser 14 beam is kept at an intensity below writing. The recording circuits (not shown but known) time the laser 14 beam scan from sector mark SM to a point to write calibrate pattern CAL 0 in area 209 followed by writing gap 210 and a WCS identifying field BF 215 in a trailing most portion of WCS. The first test pattern CAL 0 is written at a minimum write beam intensity, such as shown in FIG. 10 and in the document incorporated by reference U.S. Pat. No. 5,185,733. In the next series of passes over the WCS sector being written at increasing leading positions in WCS, steps 294 through 301 are executed a number of times, such as nine, for enabling convergence of the laser write power calibration to the disk 10 for obtaining a maximal readback signal amplitude. Step 292 writes a laser test signal at CAL x, where x is an integer from 1 to N, N being 8 in the instant embodiment. Steps 294–301 are repeated in successive passes at increasingly leading positions in WCS by laser 14 beam over the WCS sector being written until a maximum readback signal amplitude can be determined. Each successive pass writes the same pattern at increasing write beam intensities at respective more leading positions in WCS that is spaced from the immediately preceding written test pattern by a small space or gap (one to two unwritten byte positions). In each pass, the test pattern is written at a different laser 14 beam intensity, the immediately preceding written test pattern (written to be read after writing the current test pattern) is read and analyzed as set forth above and in U.S. Pat. No. 5,185,733 and is not repeated here.

Returning now to the FIG. 16 machine operations chart, step 293 then initializes in table 46 a number of samples to be taken for each value, i.e. the number of passes by the laser beam over the WCS being generated. In a constructed embodiment, the number of samples taken is eight. A minimum of three samples are needed to generate a curve as seen in FIG. 13B. There is no theoretical limit to a maximal number of samples that may be taken. The total number of passes is the number of samples plus one. The additional pass is required to sense the last laser test signal written, as will become apparent.

Steps 294–301 effect the sample writing and sensing of N samples. Step 294 updates laser current supplying DAC 23 using a value from the above-mentioned DAC source table stored in table area 46 for the first sample. For each pass numbered X, where X is an integer from one to N, step 295 checks for pass N+1 (last sample). In pass N+1, the sample N is read and no additional sample is written. Accordingly, step 296 sets DAC 23 to a read power level resulting in an emitted read power level beam from laser 14. In passes 1 through N, step 296 is omitted enabling step 297 to write a laser test calibrate signal x, then set DAC 23 to read power level for reading previously written laser test signal (sample) x−1. When x=1, no reading occurs as there is no laser test signal zero (x−1=0). In this iterative scanning, all sensed readback signal amplitudes are stored in a test table (not shown) in table area 46. A small space may be left unrecorded between adjacent recorded laser test signals 1–8. Step 296 senses which pass is occurring. If the pass is the first pass that senses sample 0, then step 299 discards any readback value. Such discarding can be inhibiting reading the laser test signal in step 297. Then, step 300 saves the sensed readback amplitudes of respective samples 1 through N in test table of table area 46. Step 301 is the iteration control. If all samples have been taken (sample N has been read), the steps 302–305 are performed. Otherwise, steps 294–301 are repeated.

Step 302 in pass N+2 writes flag field FF 131 (FIG. 12), the fields 132 and 203 followed by writing fields SYM 205 and data field 206. Steps 304 and 305 respectively determine the readback maximum signal amplitude and the laser power level for obtaining such maximum readback signal amplitude, all as set forth in document incorporated by reference U.S. Pat. No. 8,185,733. Then step 73 of FIG. 14 is performed as described above. It is also to be understood that other operating parameters can be calibrated within a WCS using the techniques of this invention. In a preferred form of the invention, step 304 after determining the peak readback signal amplitude, adds a predetermined percentage of the determined readback signal amplitude value that compensates for variations in device operations. Such variations include contamination in optics 11. Effects of variations in ambient temperatures (resulting in changing operating temperatures in the FIG. 1 illustrated device) are also accommodated. The added operating power level safety or utility factor, that is empirically determined as to percentage value, ensures a more consistent longer operation in the FIG. 1 device delaying needs for recalibration. Note that the calibration data recorded in store field 206 is unique to each calibrating device, therefore identifying the device in WCS is desired. Also, rather than record the test data as in step 302, the calculation results of steps 304 and 305 can be recorded therewith. This additional data requires that steps 304 and 305 be performed before step 302.

Figure 18:
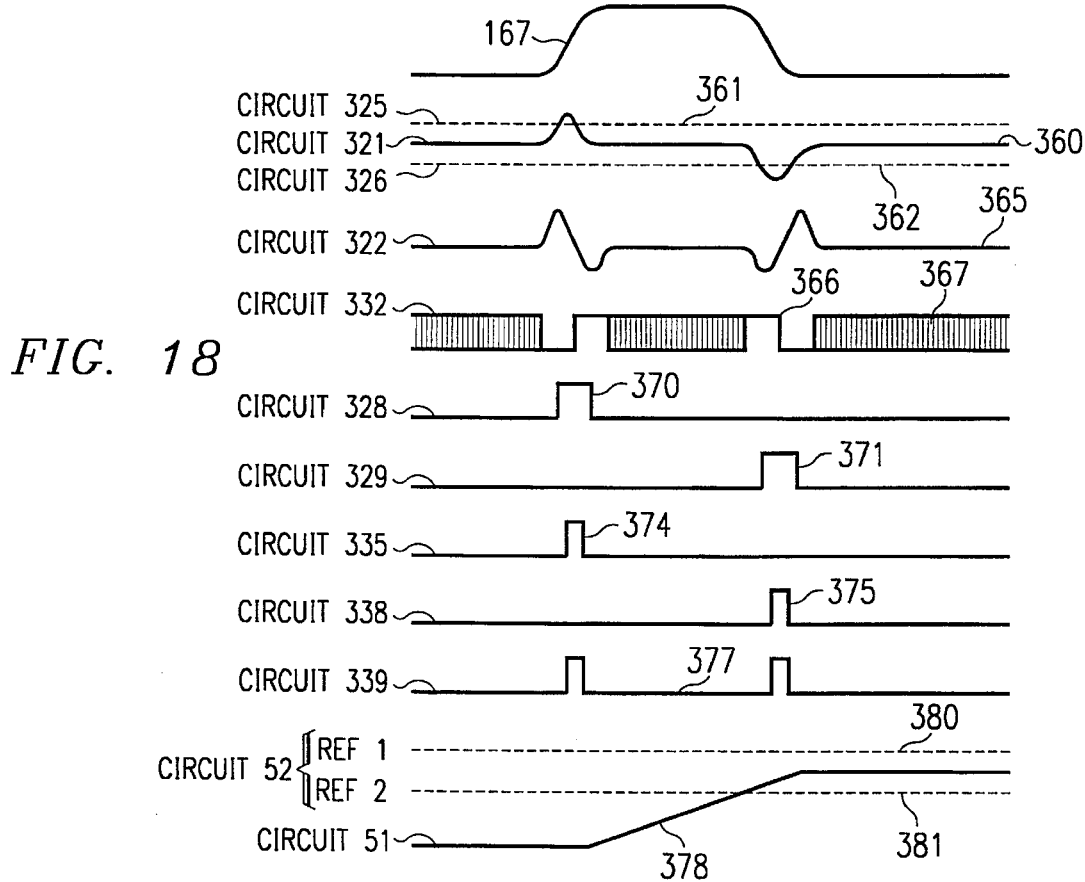

Referring next to FIGS. 17 and 18, evaluation of a readback signal for establishing a desired power level of an emitted laser write pulse is described. These circuits evaluate a readback laser test signal, such from an ALPC 132 or WCS, to obtain an indication of appropriate emitted laser beam write power level. The description assumes that the readback signal is from an ALPC 132. Detector 50 is shown as a double-differentiation detector (two differentiaters). Detector 50 includes a usual photo detector 320, shown as a photo diode, that detects a laser beam reflected from and intensity modulated by disk 10 via optics 11. Photo diode 320 supplies electrical signal 167 (shown as a laser test signal) to first differentiator 321 that outputs a signal slope-indicating signal 360 (first derivative). First differentiator 321 outputs signal 360 to second differentiator 322. Second differentiator 322 outputs signal 365 as a double-differentiated signal to detecting comparator 332. Signal 365 is a slope-change-rate indicating signal (second derivative). Comparator 332 responds to signal 365 to output signal 366 for indicating the leading and trailing edge of laser test signal 167 by the two time displaced pulses. Shaded areas 367 indicate areas of silgnal 366 that can have any amplitude—time that is not related to the leading and trailing edges of signal 167, hence not pertinent to the below described detection procedures.

Plus (+) envelope detecting circuit 325 responds to signal 360 exceeding an internal amplitude threshold value 361 to supply a signal to the negative input to comparator 328. Comparator 328 responds to signal 360 and to the plus envelope 325 signal to supply gating signal 370 to AND circuit 335. The signal 370 pulse is time aligned with the positive signal amplitude excursion of first differentiated signal 360. A second input to AND circuit 335 receives the output signal from detecting comparator 332 to supply signal 374 to OR circuit 339 for processing by circuits 51 and 52.

Similarly, negative (−) envelope detecting circuit 326 responds to first differentiated signal 360 from differentiator 321 exceeding negative threshold 362 to supply a comparison actuating signal to the positive input of comparator 329. Comparator 329 responds to the negative envelope circuit 326 supplied actuating signal to pass the negative peak of signal 360 as an AND circuit actuating signal 371 to second AND circuit 338. AND circuit 338 responds to the AND circuit actuating signal from comparator 329 to gate the output signal of inverter circuit 337 (negative signal excursion in the inverter 337 supplied signal) to OR circuit 339 as signal 375. OR circuit 339 combines the signals 374 and 375 to send signal 377 to time-to-voltage converter 51. The elapsed time between the two pulses in signal 377 indicates duration of laser test signal 167, hence is an indication of emitted laser write beam power level.

To detect and indicate the signal duration of readback test signal 167, OR circuit 339 output signals from AND circuits 335 and 338 as pulse-duration indicating signal 377 to time-to-voltage convertor 51. The elapsed time between the two pulses in signal 377 indicates duration of readback signal 167. Convertor 51 can be merely a ramp signal generator (such as an time integrator) that is actuated by the AND circuit 335 output signal and stopped by the AND circuit 338 output signal to produce signal 378 that indicates the signal 167 duration, hence its power level.

Ramp signal 378 travels to power level window comparator circuit 52 for detecting whether or not the ramp signal 378 last amplitude is within an acceptable power level range indicated by the two power level amplitude indicating signals REF-1 and REF-2 respectively indicating maximum and minimum power level thresholds 380 and 381. Comparator circuits 345 and 346 respectively output an active or error indicating signal only if the ramp signal 37 respectively exceeds or is less than thresholds 380 and 381. OR circuit 347 receives the output signals from comparators 345 and 346 to supply an error signal over line 350 to microprocessor 20. Microprocessor 20 can limit the operation of circuits 50–52 to predetermined times, such as for detecting readback laser test signals from each ALPC 132, for calibration of write laser power and the like. Circuits 50–52, by suitable reconnection, may also be used to detect the photo diode 31 generated signal as well as detecting readback laser test signals.

While the invention has been particularly shown and described with reference to preferred embodiments thereof, it will be understood by those skilled in the art that various changes in form and details may be made therein without departing from the spirit and scope of the invention.

What is claimed is:

1. A method for calibrating a laser writing system in a write-once disk recorder using a write-once disk, said write-once disk having a track consisting of a plurality of addressable sectors, each of the sectors having a leading end at which scanning of the sector begins and a trailing end at which scanning of the sector is completed:

including steps of:

selecting one of said sectors for multiple-parameter calibration of said laser writing system;

establishing first laser pulse writing criteria;

first writing a first calibration signal in a predetermined portion of said selected sector;

during said writing of said first set, monitoring the writing for generating a first measurement signal, said measurement signal indicating a first parameter of said first calibration signal;

combining said first parameter indication for setting laser power level to be emitted by the laser means;

second writing second calibration signals in a first intermediate portion of said selected sector;

reading back said written second calibration signals and comparing said readback signals with said first criterion;

selecting a write laser power level based upon a readback signal that most closely meets said second criterion;

generating an indication of said set power levels and said write power level;

writing said generated indication in an intermediate portion of said selected sector immediately adjacent said first intermediate portion.

2. The method set forth in claim 1, including steps of:

making said first measurement signal to indicate pulse power level of said first calibration signals;

converting said measured pulse power levels into laser power levels;

creating a table of laser power levels versus drive current levels for operating said laser means at a plurality of emitted laser power levels;

making said first criterion a maximum readback signal amplitude;

in said reading back step, measuring the amplitudes of each of said readback signals;

curve fitting said measured readback amplitudes for determining a predetermined power level corresponding to said fit curve;

making said predetermined power level said write laser power level.

3. A method for calibrating a laser writing system in a write-once disk recorder using a write-once disk, said write-once disk having a track consisting of a plurality of addressable sectors, each of the sectors having a leading end at which scanning of the sector begins and a trailing end at which scanning of the sector is completed:

including steps of:

selecting a predetermined one of said sectors for calibrating write intensity of said laser beam for writing data onto the write once disk, hereinafter selected sector;

establishing a parameter for a laser test signal to be measured for calibrating said laser write intensity;

establishing a reference value for indicating an acceptability of said laser write intensity;

writing an emitted laser test signal in a predetermined portion of said selected sector as a written laser test signal;

examining said laser test signal for comparing said parameter in said laser test signal with said reference value for determining from said comparison a desired parameter value; and recording data in said write once disk using said desired parameter value in the laser writing beam.

4. The method set forth in claim 3, including steps of:

generating a first plurality of copies said emitted laser test signal, generating each said copy with respective diverse light intensities and writing said copies respectively as written copies;

reading back all of said written copies [laser test signals as readback copies [a plurality of said one of said laser test signals, measuring and indicating amplitudes of each of said readback copies;

generating a polynomial curve of said measured and indicated amplitudes for finding a maximum amplitude of said plurality of said readback copies; and determining a laser power level that produces said maximum amplitude, then selecting said determined laser power level as said desired parameter value.

5. The method set forth in claim 4, including steps of:

establishing said leading end of said selected sector as a front of said selected sector;

in a given plurality of successive steps, respectively repeatedly scanning said laser beam over said selected sector to record a new one of said copies immediately in front of a last-recorded written copy, then reading said last-recorded copy as a readback copy, upon reading said last-recorded written copy, making said new one of said copies said last-recorded written copy for a next successive one of said scans over said selected sector;

for each of said scans, selecting a different write laser power level;

after recording a predetermined number of said new copies, stopping said recordings then scanning said selected sector with said laser beam for only reading said last recorded written copy without recording a new, one of said copies;

analyzing readback signal amplitudes of all of said readback copies for finding a maximal readback signal amplitude, then selecting an emitted laser beam power level for writing data signals that produced said maximal readback signal amplitude, then generating a digital indication of said selected emitted laser beam power level;

in said analyzing step, curve fitting said measured readback amplitudes for determined a predetermined power level corresponding to a fit curve;

in a next pass over said selected sector by said laser beam, recording, in an intermediate portion of selected sector that is scanned before scanning said last-recorded written copy, said selected emitted laser beam power level in front of said last-recorded written copy; and making said predetermined power level said write laser power level.

6. The method set forth in claim 5, including steps of:

in said making step, adding a predetermined value to said predetermined power level for generating an enhanced power level value; and selecting said enhanced power level value to replace said predetermined power level as said write laser power level.

7. The method set forth in claim 5, including steps of:

indicating an identification of said recorder;

recording in said intermediate portion said identification of said recorder.

8. The method set forth in claim 6, including steps of:

selecting said predetermined number equal to be eight for recording eight of said written copies in said selected sector.

9. The method set forth in claim 6, including steps of:

selecting each of said written copies a predetermined signal pattern selecting from a group of patterns having a (1,7) block code pattern including a 1010101 pattern of binary ones and zeros and a (2,7) block code pattern including a 1001001001 pattern of binary ones and zeros.

10. In the method set forth in claim 5, further including steps of:

providing a data area and a manufacturers area in said write once disk;

locating said manufacturers area in one radial portion of said write once disk and providing track and sector addresses in the manufacturers area different from track and sectors addresses in said data area; and in said selecting said sector step, selecting one of said sectors in said manufacturers area that is an unwritten one of said sectors radially closest to said data area.

11. In apparatus for calibrating a laser writing system in a write-once disk recorder using a write-once data disk, said write-once disk including a track having a plurality of addressable sectors, each of said sectors having a leading end at which scanning of the sector begins and a trailing end at which scanning of the sector is completed, an improvement including, in combination:

accessing means for selecting one of said sectors for calibrating write intensity of a writing beam while in-focus at said selected sector;

first sequence means for accessing said selected sector at predetermined portion thereof for recording a first laser test signal in said selected sector;

second sequence means for repeatedly accessing said selected sector for successively recording a first plurality of second laser test signals in respective first plurality of successive scans of said selected sectors respectively in successive positions respectively positioned closer to said leading end such that each recorded second laser test signal is positioned closer to the leading end than any previous ones of said recorded test signals;

read means in said second sequence means for reading in respective one of said scans of said selected sector one of said recorded laser test signals;

third sequence means for actuating said read means to read a last recorded one of said laser test signals that is disposed at a leading end of all said recorded laser test signals;

evaluation means connected to said read means for receiving all of said read laser test signals for comparing same with one another for indicating a predetermined signal parameter of said read laser test signals; and parameter selection means connected to said evaluation means for selecting a predetermined parameter value to be used in recording data unto said write-once disk.

12. In the apparatus set forth in claim 11 further including, in combination:

readback amplitude detection and indication means in said evaluation means for detecting and indicating a readback signal amplitude of each said readback laser test signals;

analyzing means in said parameter selection means for curve fitting said indicated readback amplitudes for finding and indicating a maximum amplitude readback signal and for indicating a desired laser beam intensity that produced said maximum amplitude readback signal as said predetermined parameter value.

13. In the apparatus set forth in claim 12, further including, in combination:

ID means indicating an identification of said recorder; and recording means connected to said ID means and to said parameter selection means for recording said identification of said recorder and said predetermined parameter value in said selected sector between the last recorded laser test signal and said leading end of said selected sector.

14. In the apparatus set forth in claim 12, further including, in combination:

adjustment means connected to said reading means for receiving said digital value signal for adding a predetermined digital value to said digital value signal for generating an enhanced digital value signal and supplying said enhanced digital value signal to said data recording control means.

15. In the apparatus set forth in claim 11 further including, in combination:

said second sequence means having seven as said first plurality;

said first and second sequence means recording each said laser test signal as a binary signal pattern that includes a pattern of a group of patterns including a (1,7) block code pattern having a 1010101 pattern and a (2,7) block code pattern having a 1001001001 pattern wherein in each "1" indicates an ablation on the write-once disk.

16. In the apparatus set forth in claim 15 further including, in combination:

said write-once disk having a data storing area and a manufacturers area in said write once disk, said manufacturers area being in one radial portion of said write once disk and having track and sector addresses in the manufacturers area different from track and sectors addresses in said data storing area; and said accessing means having means for selecting one of said sectors in said manufacturers area that is an unwritten one of said sectors radially closest to said data as said selected sector.

17. Apparatus for calibrating a laser writing system in a write-once disk recorder using a write-once disk, said write-once disk having a track consisting of a plurality of addressable sectors, each of the sectors having a leading end at which scanning of the sector begins and a trailing end at which scanning of the sector is completed:

including in combination:

select means for selecting a predetermined one of said sectors for calibrating write intensity of said laser beam for writing data onto the write once disk;

parameter means for establishing a parameter for a laser test signal to be measured for calibrating said laser write intensity;

reference means for establishing a reference value for indicating an acceptability of said laser write intensity;

a laser for emitting a laser beam;

writing means connected to said laser for supplying said laser test signal to said laser for actuating said laser to emit said laser beam as an emitted laser writing test beam in a predetermined portion of said selected sector as a written laser test signal;

examining means connected to said writing means, said parameter means and to said reference means for examining said emitted laser test beam for comparing said parameter in said one laser test signal with said reference value for determining from said comparisons a desired parameter value; and said writing means having data recording means for actuating said laser to record said laser test signal on said write once disk as a written test signal using said desired parameter value in the laser beam.

18. The apparatus set forth in claim 17, including in combination:

said writing means actuating data recording means to actuate said laser for generating a first plurality of said emitted laser test beams at respective diverse light intensities and writing said first plurality of said emitted laser test signals respectively as a plurality of said written laser test signals;

said examining means having reading means to read all of said written laser test signals as a plurality of readback test signals, measuring means in said examining means for measuring and indicating amplitudes of each of said readback test signals;

said examining means having analysis means for generating a polynomial curve of said measured and indicated amplitudes for finding a maximum readback signal amplitude of said plurality of said one laser test signals; and said examining means having output means for determining a laser power level that produces said maximum readback signal amplitude, said output means responding to said determined laser power level for selecting said determined laser power level as said desired parameter value.

19. The apparatus set forth in claim 18, including in combination:

scanning means for relatively moving said write-once disk and said laser for scanning said laser beam along a track in said write-once disk;

repeat means in said scanning means for scanning, in a given plurality of successive steps, said laser beam over said selected sector to record a new one of said written laser test signals immediately in front of a last-recorded one of said written laser test signals such that said new one of said written laser test signals is scanned before any previously written laser test signals;

said repeat means actuating said reading means to read said last-recorded laser test signal for measuring readback signal amplitude of said readback last-recorded laser test signal, said repeat means after actuating said reading means to read said last-recorded laser test signal making said new laser test signal said last-recorded laser test signal for a next successive one of said scans over said selected sector of said laser beam;

said parameter means responding to said repeat means for each of said scans selecting a different write laser power level;

said repeat means after recording a predetermined number of said new laser test signals, stopping said recording, then actuating said reading means reading said last recorded laser test signal;

said examining means having analyzing means for analyzing said readback signal amplitudes of all of said readback last-recorded laser test signals for finding a maximal amplitude;

power means in said examining means for responding to said found maximal amplitude to select an emitted laser beam power level for writing data signals that produced said maximal readback signal amplitude, generating a digital indication of said selected emitted laser beam power level;

said examining means in a subsequent scan over said selected sector, actuating said data recording means to actuate the laser to recording in an intermediate portion of selected sector that is scanned before scanning said last-recorded laser test signal, said selected emitted laser beam power level in front of said last-recorded laser test signal;

said analyzing means curve fitting said measured readback amplitudes for determining a predetermined power level corresponding to said fit curve; and said power means responding to said analyzing means for making said predetermined power level said write laser power level.

20. The apparatus set forth in claim 19, including in combination:

said power means adding a predetermined value to said predetermined power level for generating an enhanced power level value to replace said predetermined power level as said write laser power level.

21. The apparatus set forth in claim 20, including in combination:

device means for indicating an identification of said recorder;

said data recording means responding to said device means to record in said intermediate portion said identification of said recorder.

22. The apparatus set forth in claim 20, including in combination:

said repeat means making said predetermined number equal to eight for recording eight of said laser test signals.

23. The apparatus set forth in claim 20, including in combination:

said data recording means having format means for making each of said calibration signals a predetermined signal pattern selecting from a group of patterns having a (1,7) block code pattern including a 1010101 pattern of binary ones and zeros and a (2,7) block code pattern including a 1001001001 pattern of binary ones and zeros.

24. In the apparatus set forth in claim 20, further including in combination:

said write-once optical disk having a data area and a manufacturers area;

said manufacturers area disposed in one radial portion of said write once disk and having track and sector addresses in the manufacturers area different from track and sectors addresses in said data area; and selecting said writing means selecting one of said sectors in said manufacturers area that is an unwritten one of said sectors radially closest to said data area to be said selected sector.

* * * * *